(12) United States Patent
Lumberg et al.

(10) Patent No.: US 6,508,153 B1
(45) Date of Patent: Jan. 21, 2003

(54) CONVEYOR PRODUCT TRANSFER APPARATUS AND METHOD

(75) Inventors: Eric J. Lumberg, Poplar, WI (US); Jeffrey A. Gendron, Ashland, WI (US)

(73) Assignee: C.G. Bretting Mfg. Co., Inc., Ashland, WI (US)

( * ) Notice: Subject to any disclaimer, the term of this patent is extended or adjusted under 35 U.S.C. 154(b) by 0 days.

(21) Appl. No.: 09/498,282

(22) Filed: Feb. 4, 2000

(51) Int. Cl.[7] ............................. B23D 25/04; B26D 1/56
(52) U.S. Cl. ............................. 83/318; 83/437.1; 83/409
(58) Field of Search ........................... 493/362, 365, 493/369; 198/465.1, 468.9, 476.1, 604, 600; 83/151, 153, 155, 318–320, 353, 356.2, 373–375, 409, 422, 437.1, 438, 447, 452, 453, 466.1

(56) References Cited

U.S. PATENT DOCUMENTS

| | | | |
|---|---|---|---|
| 4,579,483 A | * 4/1986 | Pandovani | 83/732 |
| 4,625,857 A | * 12/1986 | Kuehi | 198/465.1 |
| 4,964,325 A | * 10/1990 | Hartmann, Jr. et al. | 83/321 |
| 5,400,574 A | * 3/1995 | Spatafora | 53/531 |
| 5,449,061 A | 9/1995 | Wald | |
| 5,584,373 A | * 12/1996 | Layne | 198/464.4 |
| 5,634,550 A | * 6/1997 | Ensch et al. | 198/457 |
| 6,164,435 A | * 12/2000 | Coen et al. | 198/600 |
| 6,332,527 B1 | 12/2001 | Wierschke | |

* cited by examiner

Primary Examiner—Scott A. Smith
Assistant Examiner—Hemant M. Desai
(74) Attorney, Agent, or Firm—Michael Best & Friedrich LLP

(57) ABSTRACT

The conveyor product transfer apparatus of the present invention includes at least one product transfer member mounted for translational (and preferably reciprocating) movement between product conveying surfaces or between a discharge or receiving station and a conveying surface separated by a distance sufficient to provide equipment clearance for an operation performed upon product transferred by the transfer member. Preferably, each transfer member is mounted for reciprocating translational movement between ends of conveying surfaces that are separated a distance apart, and has a sliding member in sliding engagement with a track to facilitate such movement. Each transfer member is coupled to an actuation assembly for movement thereof. The actuation assembly is preferably a camshaft assembly. To support the conveyed product during product processing operations (e.g., product cutting) in the gap, the present invention also preferably includes a kick member mounted for movement into and out of the gap between the conveying surfaces. In product cutting operations, the kick member preferably backs the product being cut adjacent to the saw blade and preferably is timed to move away from the gap after the product has been cut. Most preferably, this motion is reciprocating and is generated by a camshaft and cam assembly. The actuation assemblies of the transfer members and the camshaft and cam assembly of the kick member are preferably coupled to and driven by the same motor driving the log saw so that the transfer members, kick member, and log saw operate in synchronicity.

36 Claims, 4 Drawing Sheets

CONVEYOR PRODUCT TRANSFER APPARATUS AND METHOD

FIELD OF THE INVENTION

The present invention relates to conveyor systems and methods, and more particularly to systems and methods for transferring product to, from, or between conveying systems while performing product processing operations upon the product being transferred.

BACKGROUND OF THE INVENTION

Continued advances in material handling and processing systems have generated increased demand for systems that are faster and more versatile than their earlier counterparts. This fact is well demonstrated in systems that process and convey paper product, such as stacks of napkins, kitchen and bathroom toweling, and the like. Such product is often stacked or wound into elongated stacks or rolls (referred to herein as "logs") for downstream processing such as log cutting, sealing, and the like. It should be noted that reference in the present application and appended claims to "logs" of material or "product" include rolled, stacked, or bundled product made of any material, such as paper, plastic, rubber, metal, composites, fabric, and the like. However, for purposes of discussion and example only, the terms "log" and "product" in the remainder of this specification refers to an elongated stack of folded napkins.

A problem that continues to exist in log processing and conveying systems (as well as in many other material processing and conveying systems) is the transfer of logs during a log processing operation from one conveying surface to another. For example, long logs of napkins or long logs of wound toilet paper typically need to be cut into shorter user-sized stacks or rolls prior to being packaged. Log cutting operations usually require a minimal gap in the log conveying system through which a blade is passed to cut the passing logs. In log saw and other log processing operations, this gap can be larger or smaller depending upon a number of factors such as space constraints, log speed, machine speed (e.g., saw speed), and the like. Even the type of machine used can affect the gap size required between conveying surfaces. A log saw may require much greater space between conveying surfaces to perform its cutting operation than a log bander or other device. Regardless of the type of machine involved, however, logs passing a gap between conveying surfaces often must be supported or constrained as they pass the gap. Specifically, some logs can sag, fan, or expand prior to crossing the gap to a downstream conveying surface or need support while an operation is performed upon the portion of the log spanning the gap. In conventional log handling and processing systems, a popular remedy for this problem is to attach log support members to one or both conveying surfaces beside the gap. The log support members therefore move with their attached conveying surface(s) and move into and out of the gap as the conveying surface(s) move product through the gap.

Conventional designs such as the one just described for guiding, supporting, and/or feeding logs between conveying surfaces have a very limited ability to accept changes to system operation. Conventional systems generally have no ability to quickly vary the gap between the upstream and downstream conveying surfaces—either during product processing or between processing runs. It is often desirable to vary this gap for a number of different reasons, including without limitation to adjust for changes in product speed, machine speed, (e.g., the orbiting speed of a log saw), and log material, dimensions, or shape. For many conventional systems, a user can only change the gap by stopping the system, detaching and removing the log support members from the conveying surfaces, and replacing and attaching shorter or longer log support members on the conveying surfaces. Longer support members are able to span larger gaps, while shorter support members are installed for narrower gaps. Especially where system or log changes are frequently made (thereby calling for changes in gap size), significant production time is lost in changing the support members to adjust for different gap sizes. In addition to being difficult and time consuming to adjust, such systems are expensive to manufacture and maintain, require a user to keep an inventory of different log support types, and generally do not permit "on-the-fly" user adjustability in response to gap changes.

In light of the problems and limitations of the prior art described above, a need exists for a conveyor product transfer apparatus and method for transferring product to, from, or between conveying surfaces separated by a gap, which supports or at least partially restrains product as it passes the gap and as a product processing operation (e.g., cutting) is performed upon the product, which is relatively simple and inexpensive to manufacture and maintain, which is well-suited for product transfer where different gap widths are required, and which can be quickly adjusted without system shutdown or disassembly. Each preferred embodiment of the present invention achieves one or more of these results.

SUMMARY OF THE INVENTION

The conveyor product transfer apparatus of the present invention includes at least one product transfer member mounted for movement between product conveying surfaces or between a discharge or receiving station and a conveying surface separated by a distance sufficient to provide equipment clearance for an operation performed upon the product transferred by the transfer member. Preferably, the product transfer member is mounted for movement having a translational component and most preferably for movement that is substantially translational. The movement of the product transfer member is preferably reciprocating. Also preferably, the operation performed upon the product transferred is a log saw cutting operation and the equipment is a log saw, but the present invention can also be used in conjunction with numerous other applications requiring the above-mentioned clearance.

Different applications of the present invention can employ any number of transfer members. In one preferred embodiment, each transfer member is mounted for reciprocating, substantially translational movement between ends of conveying surfaces that are separated a distance apart, and has a sliding member in sliding engagement with a track to facilitate such movement. Each transfer member is coupled to an actuation assembly for movement thereof. The actuation assembly is most preferably a camshaft assembly transferring rotational driving power received from a motor or other conventional driving device to at least partially translational motion for moving the connected transfer member through its product stations, although any mechanism for providing such translational movement can be used. The product stations include a product receiving station located adjacent to a conveying surface for receiving product from the conveying surface, a processing station (which in a preferred embodiment of the present invention is a product cutting station), and a product discharge station located a distance from the product receiving station. Depending upon where the product is cut in the gap between the conveying surfaces, the product cutting station can be at least partly located at the product receiving or product discharge stations. The transfer member(s) move with product passing the gap to support the product in the gap or to at least partially contain the product in the gap. Because the transfer members preferably reciprocate, the transfer members can pass through their stations multiple times for longer products being processed.

The transfer member(s) preferably provide support for the product through the gap until the product is discharged to a downstream conveying surface. Accordingly, the speed of the product or machine and the size of the gap needed to complete a particular operation (such as product cutting) is irrelevant because the support moves with the product, unlike conventional systems which require changing support members when product sizes or machine speeds change.

In another preferred embodiment of the present invention, two transfer members face one another and move together with product passed therebetween. In other embodiments, one transfer member reciprocates between conveying surfaces separated a distance apart and acts primarily to support the product from underneath as it passes from the upstream conveying surface to the downstream conveying surface.

To support the conveyed product during product processing operations (e.g., product cutting) in the gap, the present invention also preferably includes a kick member mounted for movement into and out of the gap between the conveying surfaces. In product cutting operations, the kick member preferably backs the product being cut adjacent to the saw blade and preferably is timed to move away from the gap after the product has been cut. Most preferably, this motion is a reciprocating motion generated by a camshaft and cam assembly coupled to the kick member.

At least one of the upstream conveying surfaces preferably has an end roller and an end plate adjacent to the gap and to the product receiving station of the transfer member to help provide smooth product transfer from the upstream conveying surface to the transfer member. An end roller and/or an end plate can also be located on facing upstream conveying surfaces or even on downstream conveying surfaces if desired.

In operation of the present invention, product is received by the transfer member(s) driven to move with the conveyed product through at least part of the gap to a downstream location where the product is discharged from the transfer member(s). Preferably, product is transferred between upstream conveying surfaces and downstream conveying surfaces by transfer members which move through substantially the entire gap between the conveying surfaces. Also preferably, two transfer members are driven by respective actuation assemblies (which preferably are camshaft assemblies). Where the kick member is employed, the log saw cuts the product while the kick member is in a product supporting position backing the product in the gap. Most preferably, the transfer member camshaft assemblies and the connected transfer members are driven by a series of belts and pulleys that are coupled to and driven by the same motor that drives the log saw. Therefore, the transfer members preferably move in synchronicity with the log saw so that cutting operations occur at a desired transfer member location in the gap. The kick member is also preferably driven by a series of belts and pulleys that are coupled to and driven by the same motor that drives the log saw. Therefore, the kick member preferably also moves in synchronicity with the log saw so that the kick member is in its product supporting position while the saw is cutting the product.

Further objects and advantages of the present invention, together with the organization and manner of operation thereof, will become apparent from the following detailed description of the invention when taken in conjunction with the accompanying drawings, wherein like elements have like numerals throughout the drawings.

BRIEF DESCRIPTION OF THE DRAWINGS

The present invention is further described with reference to the accompanying drawings, which show a preferred embodiment of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

In the drawings, wherein like reference numerals indicate like parts.

DETAILED DESCRIPTION OF THE PREFERRED EMBODIMENTS

Figure 1:
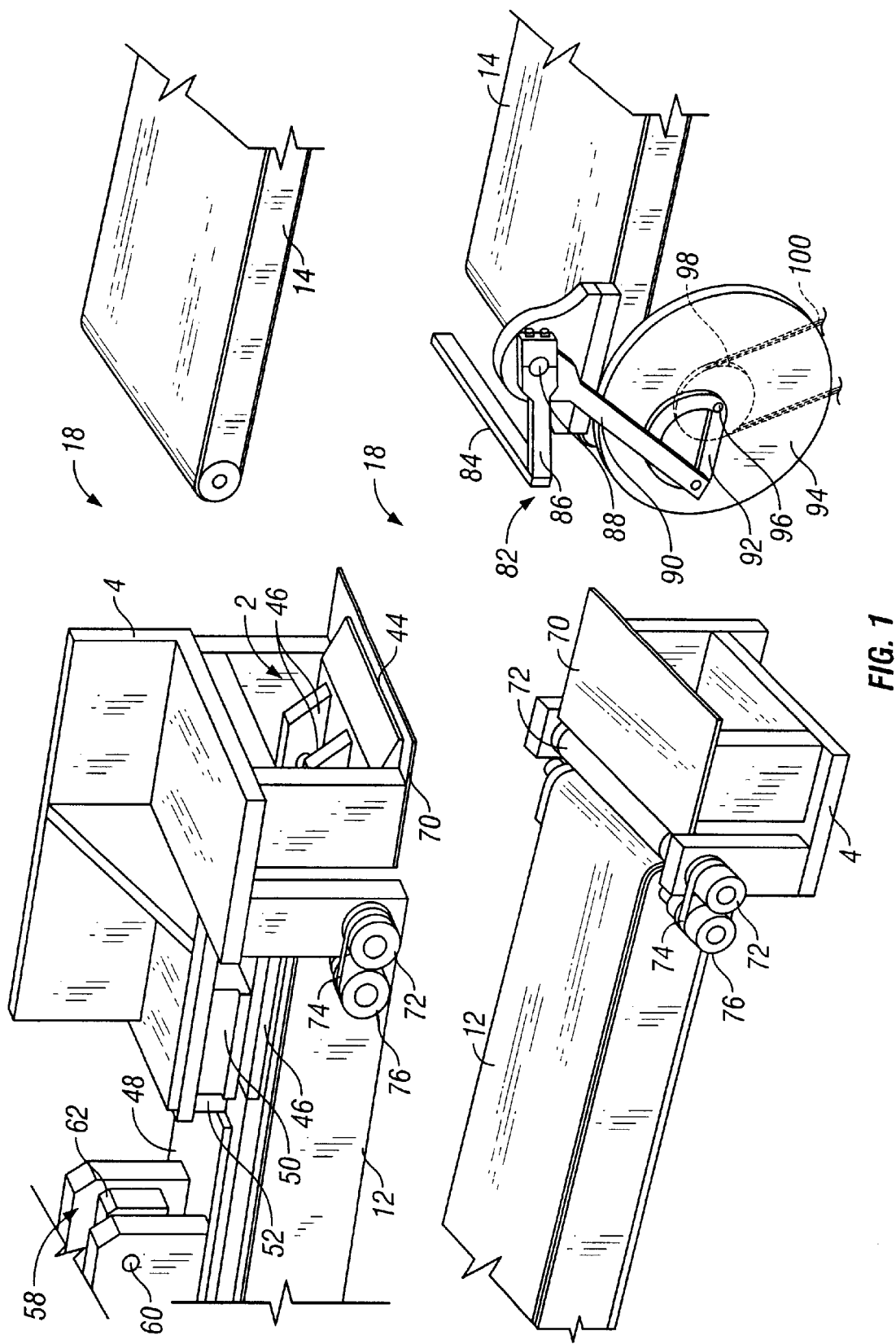
FIG. 1 is a perspective view of the transfer apparatus according to a first preferred embodiment of the present invention, looking in an upstream direction of product conveyance.
Figure 2:
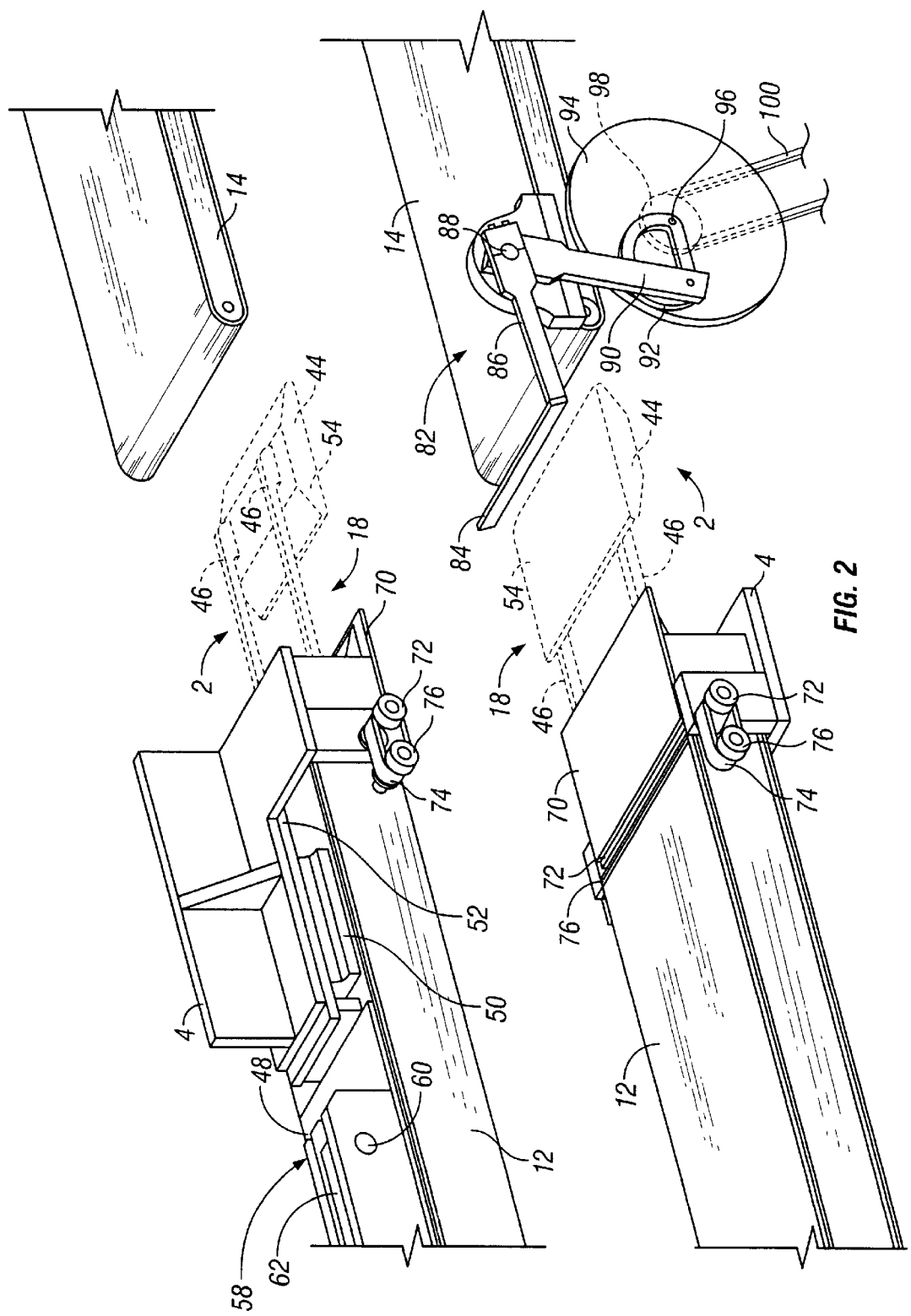
FIG. 2 is a perspective view of the transfer apparatus according to the first preferred embodiment, looking in a downstream direction of product conveyance.

With reference to FIG. 1, a preferred application and preferred embodiment of the present invention involves the transfer of product between conveying surfaces that are spaced apart a distance to facilitate cutting of the product. The preferred illustrated system has a pair of upstream conveyor belts 12 and a pair of downstream conveyor belts 14, and a log saw 15 (see FIG. 3) for cutting product passed therebetween. Preferably, the log saw 15 is an orbital log saw. Specifically, the log saw 15 has a blade 16 rotatably mounted upon a rotating arm 17 that orbits the blade 16 into contact with product passing from the upstream conveyor belts i2 through to the downstream conveyor belts 14. To attain higher product speeds through the system, the log saw 15 is most preferably an orbital skew saw. The blade of an orbital skew saw travels a distance with the product as it is cutting the product, thereby permitting the saw to produce straight cuts through product moving at relatively high speeds. Such blade movement is illustrated by way of example in FIG. 4, where progressive cutting stages of an orbital skew log saw blade are shown. Orbital saws, orbital skew saws, and their manner of operation are well known to those skilled in the art and are not therefore described further herein. Saws of this type are disclosed, for example, in U.S. Pat. No. 4,041,813 issued to Spencer and U.S. Pat. No. 3,213,734 issued to Nystrand (the disclosures of which are incorporated herein by reference insofar as they relate to log saws and their operation).

Proper log saw operation in the illustrated system requires a minimum distance or gap 18 between the upstream conveyor belts 12 and the downstream conveyor belts 14, thereby permitting the saw 15 (or at least the saw blade 16) to pass between the conveyor belts 12, 14 without interference. Although this gap 18 can be fairly narrow such as where product is moving across the gap 18 at relatively slow speeds or where the log saw blade 16 has little to no travel along the product path, the gap 18 can be relatively large for faster product speeds or slower blade speeds.

The conveyor belts 12, 14 are conventional in nature and convey logs to and from the gap 18. Although not required to practice the present invention, the upstream and downstream conveyor belts 12, 14 are preferably arranged in pairs, with each pair being horizontally oriented and having an upper belt located above a lower belt as shown in the figures. In such an arrangement, product passed between each pair of belts can be slightly compressed and can therefore be better controlled and manipulated. In highly preferred embodiments such as that shown in the figures, at least one pair of conveyor belts 12, 14 and most preferably both pairs of conveyor belts 12, 14 are adjustable to change the distance therebetween. Distance adjustment can be performed in a number of manners well known to those skilled in the art, such as by turning one or more threaded rods attached to an upper or lower conveyor belt, by one or more hydraulic or pneumatic lift assemblies attached in a similar manner, by a cable and pulley assembly adjustable by retracting or extending cable from a cable spool or other cable source, and the like. Such conveyor belt positioning systems can be adjusted automatically by a system controller or by user-operable controls or manually by a hand crank, jack device, or other conventional mechanism. Positioning systems and their manners of adjustment are well known to those skilled in the art and are therefore not described further herein. In any of these conventional positioning mechanisms, adjustment can be performed by moving both the upper and lower conveyor belts in each conveyor belt pair 12, 14. However, in more highly preferred embodiments of the present invention such as that shown in the figures, only one of the upper and lower belts is adjustable to close or widen the distance between the belts in each pair.

As an alternative to the system illustrated in the figures, either pair of upstream conveyor belts 12, 14 can be replaced by a single belt (preferably located in the lower position shown in the figures) for supporting and conveying product.

Figure 3:
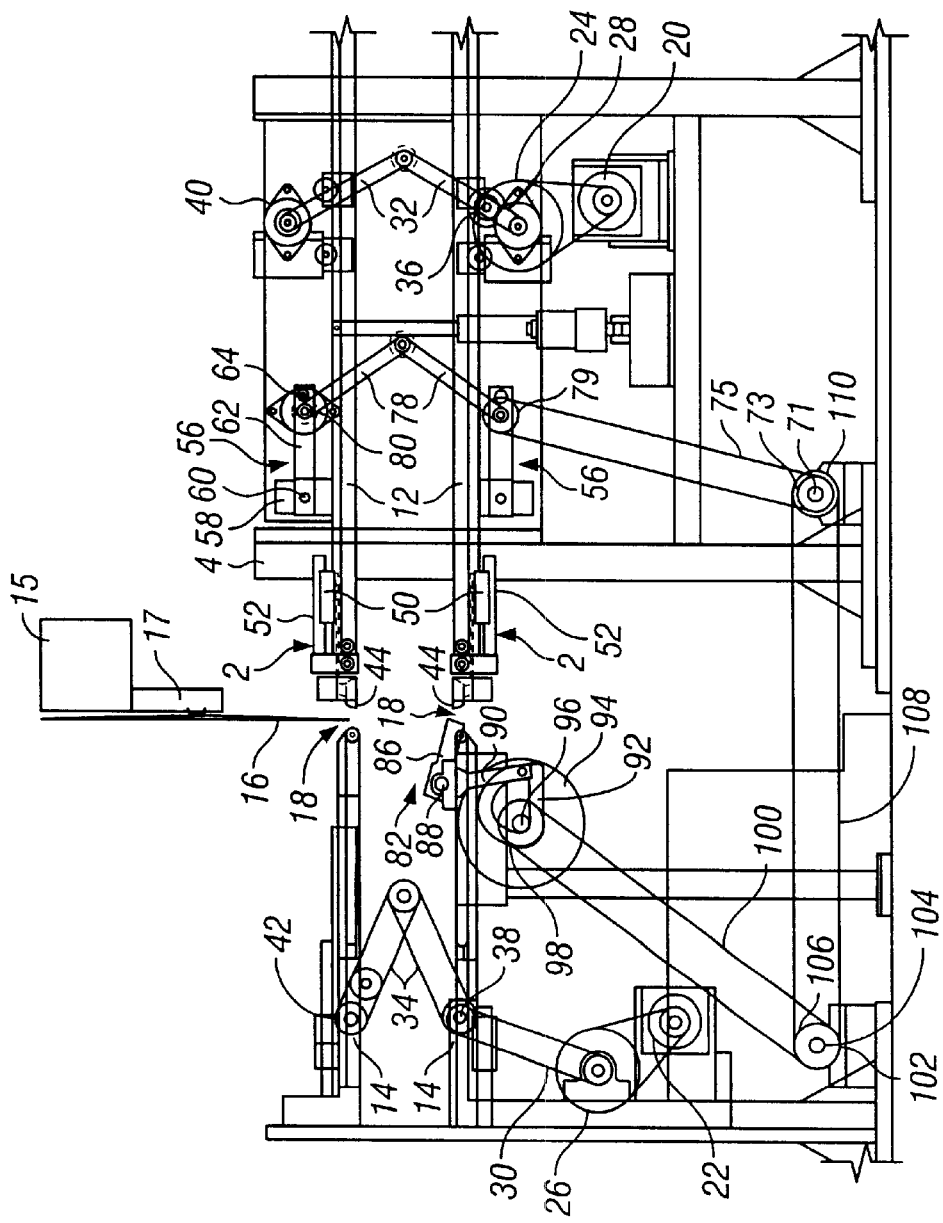
FIG. 3 is a side elevational view of the transfer apparatus illustrated in FIGS. 1 and 2, showing the assemblies driving the transfer apparatus.

Preferably, each pair of conveyor belts 12, 14 in the illustrated embodiment is separately driven in a conventional manner by a dedicated motor 20, 22, respectively (see FIG. 3), via speed reducing pulleys 24, 26 as needed. Although motors are preferred as driving devices for the conveyor belts 12, 14, any other conventional power generating device can instead be used as is well known to those skilled in the art. The motors 20, 22 are preferably controlled in a conventional manner by a system controller (not shown). Power can be transferred from the speed reducing pulleys 24, 26 to each belt in the pair of conveyor belts 12, 14 in any conventional manner, one of which is shown by way of example in the figures. As best shown in FIG. 3, power is preferably transmitted from the speed reducing pulleys 24, 26 to the lower conveyor belts 12, 14 via a first set of belts 28, 30. Power is then transmitted to the upper conveyor belts 12, 14 by belts 32, 34 passed around conveyor belt pulleys 36, 38 and 40, 42 driving the lower and upper conveyor belts (respectively) of each pair of conveyor belts 12, 14. Because the distance between each conveyor belt pair 12, 14 is preferably variable as described above, the belts 32, 34 are preferably in a jointed assembly capable of movement to accommodate different belt distances. A number of other conventional assemblies and arrangements can instead be used to power the upper and lower conveyor belts 12, 14 across the span separating each pair while accommodating for span change. For example, the upper and lower conveyor belts 12, 14 can be separately powered by dedicated motors, actuators, and the like, can be driven in a manner similar to that shown in FIG. 3 by chain and sprocket assemblies or cable and pulley assemblies, etc. Such other assemblies and arrangements are well known to those skilled in the art and are not therefore described further herein.

Figure 4:
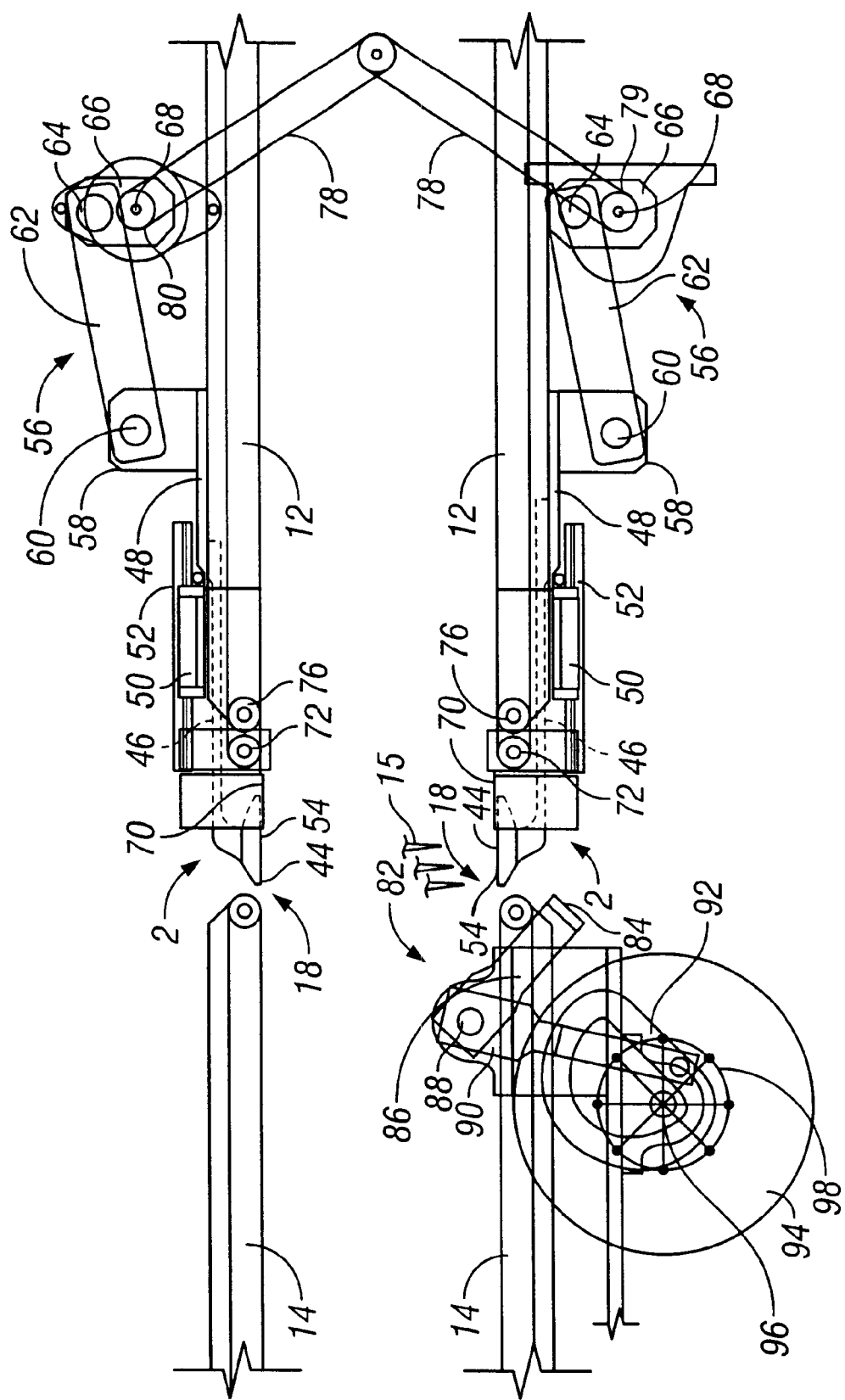
FIG. 4 is a side elevational view of the transfer apparatus illustrated in FIGS. 1–3, showing different stages of a log cutting operation.

To transfer product being conveyed from the upstream pair of conveyor belts 12 to the downstream pair of conveyor belts 14, highly preferred embodiments of the present invention employ at least one transfer member 2 mounted for reciprocating movement between the pair of conveyor belts 12, 14. In the preferred embodiment illustrated in FIGS. 1–4, transfer members 2 associated with the top and bottom upstream conveyor belts 12 face each other and define a throat though which conveyed product passes. Preferably, each transfer member 2 has a plate 44 attached in a conventional manner (e.g., by bolts and nuts, screws, or other threaded fasteners, by welding, gluing, soldering, riveting, and the like) to a pair of plate supports 46 extending away from the plate 44. Each plate 44 is preferably a unitary element having a flat surface 54 facing passing product and defining a surface of the throat between the plates 44. This surface 54 is preferably a product contacting surface, and can be a product supporting surface as described in more detail below. The plates 44 can be replaced by a number of elements collectively presenting such a surface to the passing product. Such elements include without limitation a set of fingers, one or more rods or bars, etc. To improve slip and wear characteristics in highly preferred embodiment of the present invention, the plate 44 is made from plastic. However, the plate 44 can instead be made from metal or other material as desired. As best shown in FIG. 4, the plate supports 46 are preferably attached to a mounting plate 48 and to a slider member 50 also in a conventional manner.

Each slider member 50 is preferably mounted for sliding movement along a track 52 which itself is preferably secured with respect to a system frame 4. The tracks 52 and the slider members 50 are conventional in nature and are therefore not described further herein. However, it should be noted that terms such as "slide", "slider" and "sliding" as used herein and in the appended claims is not limited to motion that is accomplished in any particular manner, but includes all translational and substantially translational motion generated in any conventional manner (including the use of bearings, rollers, fluid bearings, and the like). The tracks 52 in the illustrated preferred embodiment are preferably oriented so that the attached plate 44 translates between lower or upper conveyor belts 12, 14 with the surface 54 of each plate 44 being coplanar or nearly coplanar with a product conveying portion of the lower or upper conveyor belts 12, 14. Movement of a transfer member 2 causes the slider member 50 to slide upon its track 52, thereby moving the attached plate 44 between respective lower or upper conveyor belts 12, 14.

Although the preferred embodiment of the transfer member 2 is described above and shown in the figures, it will be appreciated by one having ordinary skill in the art that the transfer members 2 can be somewhat different in shape and form as desired. Specifically, the plates 44 (or other member types as the case may be), plate supports 46, mounting plates 48, and slider members 50 making up the transfer members 2 need not necessarily be separate elements connected to one another. Instead, any or all of these elements can be integral.

Also, the transfer members 2 need not necessarily have separately identifiable elements performing the various functions described above, such as to slide along the track 52, to provide a mounting point for the camshaft assembly 56 as described in more detail below, and the like. In alternative designs of the transfer members 2, the plate supports 46, slider member 50, and mounting plate 48 are replaced by one element in mating and sliding engagement with the track 52 and having a rear portion for mounting a driving element such as the camshaft assembly 56. As another example, the plate supports 46 can be replaced any number of different structures extending from the plates 44 (and providing support therefore) toward the track 52 and camshaft assemblies 56. Also, any number of well known translating and sliding assemblies can be used in place of the track 52 and slider member 50 disclosed. Such alternative designs, elements, and assemblies fall within the spirit and scope of the present invention.

In the most highly preferred embodiments of the present invention, each transfer member 2 is driven by a camshaft assembly 56 which itself is driven by a motor (not shown) controlled by the system controller (also not shown). As with the motors 20, 22 driving the conveyor belts 12, 14, the motor driving the camshaft assemblies 56 and the transfer members 2 can be replaced by any other conventional power generating device as is well known to those skilled in the art. Each camshaft assembly 56 preferably has a camshaft mount 58 which can take the form of a pair of spaced-apart plates spanned by a camshaft pin 60 and attached in a conventional manner (see above) to the mounting plate 48 as shown in the figures. Each camshaft assembly 56 also preferably has a camshaft 62 pivotably attached at one end by camshaft pin 60 to the camshaft mount 58 and pivotably attached at another end by a second camshaft pin 64 to a crank arm 66. Each crank arm 66 is preferably mounted in a conventional manner for rotation upon a pivot 68 located a distance from the second camshaft pin 64 and driven as will be described below. Therefore, by turning the pivots 68, the attached crank arms 66 rotate with the pivots 68, thereby driving the camshaft 62 and the camshaft mount 58 attached thereto and thereby driving the attached transfer member. The transfer member 2 is therefore caused to slide between the upper and lower conveyor belts 12, 14. With particular reference to FIGS. 3 and 4, a full rotation of the pivots 68 causes the transfer members 2 to pass through an entire cycle of extension and retraction.

It should be noted that the camshaft mounts 58 can be replaced by elements or structure significantly different in form or shape to the illustrated camshaft mounts 58 but which perform the same function (providing a connection between the camshaft 62 and the transfer member 2 and capable of driving the same from a rotating member such as pivot 68). For example, the camshaft 62 can be pinned for rotation or connected by a pivot directly to the mounting plate 48, slider member 50, or plate supports 46. The camshaft pin 60 can be fixed in place in aligned apertures in the camshaft mount 58 and camshaft 62 in any conventional manner (e.g., by flared or enlarged ends, by cotter pins, by capped ends, and the like), or can be attached to or be integral with either the camshaft mount 58 or the camshaft 62. The camshaft mount 58 can be a single plate having a camshaft pin 60 attached thereto or having an aperture through which the camshaft pin 60 is received, can be a U-shaped rod secured at both ends to the mounting plate to provide a portion about which the camshaft 62 can rotate, etc. Similarly, the crank arms 66 can be replaced by cams, L-shaped pins extending radially from the second camshaft pin 64 and to which the camshaft 62 is connected, and the like.

The camshaft assemblies 56 are preferably powered by belts and pulleys in much the same manner as described above with reference to the upper and lower conveyor belts 12, 14, although the camshaft assemblies 56 can be directly driven in any conventional manner (such as by dedicated motors, actuators, or other conventional power generating devices). Referring now to FIGS. 3 and 4, a motor (not shown) preferably drives a shaft 71 upon which a pulley 73 is mounted. A belt 75 preferably runs around the pulley 73 and around a second pulley 79 on the pivots 68 of the lower camshaft assembly 56. In this manner, the pivot 68 of the lower upstream conveyor belt 12 is powered to turn and to cause the connected transfer member 2 to reciprocate as described above. Preferably, the upper camshaft assembly 56 is powered in a manner similar to the upper upstream conveyor belt 12 as described above. Specifically, a jointed belt assembly 78 is driven by the pulley 79 conventionally mounted on the lower camshaft assembly pivot 68 (or by another pulley on the same pivot 68) and drives the pivot 68 on the upper camshaft assembly 56 by another pulley 80 conventionally mounted thereon. By employing the jointed belt assembly 78, the distance between the upstream conveyor belts 12 can be adjusted as desired. Jointed belt assemblies and their operation are well known to those skilled in the art and are not therefore described further herein. It should also be noted that the pivots 68 of the upper and lower camshaft assemblies 56 can be driven in a number of alternative manners as described above with reference to driving the upper and lower conveyor belts of the upstream and downstream conveyor belt pairs 12, 14. Also, the driven end of the camshafts 62 can be connected for orbital movement about their respective pivots 68 in a number of other ways well known to those skilled in the art. For example, the second camshaft pins 64 can be fitted directly to the pulleys 80 of the camshaft assemblies 56 so that the pulleys 80 drive the camshafts 62 directly. Other conventional elements and assemblies capable of connecting a camshaft 62 to a rotating member can also be used and fall within the spirit and scope of the present invention.

Although not required to practice the present invention, it is desirable to add a number of elements to the upstream conveyor belt system to provide improved transfer of product from the upstream conveyor belts 12 to the transfer members 2. Specifically, the present invention preferably has an end surface 70 at the end of each of the upstream conveyor belts 12 as shown in the figures. These end surfaces 70 are most preferably in the form of flat plates in substantial alignment and substantially co-planar to the facing surfaces of the upstream conveyor belts 12. In the illustrated preferred embodiment, the plates defining the end surfaces 70 are attached in a conventional manner to the frame 4 of the system immediately below the plate 44 of the upper transfer member 2 and immediately above the plate 44 of the lower transfer member 2. Although the end surfaces 70 are preferably plates as shown in the figures, the end surfaces 70 can take any other form along or beside which the conveyed product moves to the gap 18, including without limitation a series of fingers, one or more slides, etc.

To improve the transfer of product from the upstream conveyor belts 12 to the end surfaces 70, an end roller 72 is preferably mounted in a conventional manner between the end of each upstream conveyor belt 12 and the plates 44 of the transfer members 2. The end rollers 72 are preferably driven at each end by takeoff belts 74, which run around the ends of (and are driven by) the end rollers 76 of the upstream conveyor belts 12. On less preferred embodiments, end rollers 72 can be used even when no end surfaces 70 exist on the system. Also, it should be noted that end surfaces, end rollers, or both end surfaces and end rollers can be employed on the downstream conveyor belts 14 if desired, with the arrangement and location of such elements and the downstream conveyor belts 14 preferably being the same as described above with reference to end surfaces 70 and end rollers 72. However, these elements are most effectively applied only in relation to the upstream conveyor belts 12.

At certain log saw and product speeds and with certain product being processed, it may be desirable to provide some degree of product support against the force of the log saw blade 16. However, the moving log saw blade 16 can require clearance due to its movement with the product and/or due to the dimensions of the log saw 15 itself. To provide product support while providing the necessary clearance, the present invention can (and preferably does) employs a kick member 82 movable into and out of a product supporting position. The kick member 82 is preferably a two piece L-shaped element having a transverse bar 84 and a swing arm 86 attached thereto in a conventional manner. However, one-piece kick members 82 can instead be used if desired. For desirable wear and low slip characteristics, the transverse bar 84 is preferably made of a plastic material and can be disconnected from the swing arm 86 for service and/or replacement. The transverse bar 84 preferably spans across the width of the downstream conveyor belts 14.

Preferably, the kick member 82 is conventionally mounted to a pivot 88 for rotation therewith. In the preferred embodiment of the present invention, the pivot 88 is located beside the lower downstream conveyor belt 14. However, the pivot 88 can instead be located beneath the lower downstream conveyor belt 14 (in which case the pivot 88 can span across the width of the downstream conveyor belts 14 and can be connected at opposite ends to a U-shaped kick member 82) or in a number of other locations suitable for moving the kick member 82 to and from a product supporting position between the upstream and downstream conveyor belts 12, 14. To rotate the pivot 88 and to thereby swing the kick member 82, a camshaft 90 is preferably also connected in a conventional manner to the pivot 88 for movement therewith. In addition or alternatively, the camshaft 90 can be connected in a conventional manner directly to the kick member 82 near or at the pivot 88.

The camshaft 90 is preferably connected at an opposite end to a cam 92 on a cam wheel 94 mounted upon a cam wheel pivot 96. A cam wheel pulley 98 is preferably mounted upon the cam wheel pivot 96 in a conventional manner for rotation therewith, and has a cam wheel belt 100 passed therearound for driving the cam wheel pivot 96 and the kick member 82. The cam wheel belt 100 is preferably driven via further belts and pulleys to the same motor driving the camshaft assemblies 56. In the illustrated preferred embodiment, the cam wheel belt 100 passes around a pulley 102 mounted in a conventional manner upon a shaft 104 for rotation therewith. Preferably, another pulley 106 is also mounted upon the shaft 104 in a similar manner, and is driven by another belt 108 passed around another pulley 110 as best shown in FIG. 3. This pulley 110 and the pulley 73 driving the belt 75 to the camshaft assemblies 56 (see above) are both preferably mounted upon shaft 71 in a conventional manner for rotation therewith. The shaft 71 is preferably driven directly or indirectly by the log saw driving device. Specifically, the shaft 71 leads either directly to the log saw 15 (not shown) to be powered thereby, is directly connected to the same device (such as a conventional motor, not shown) driving the log saw 15, or is indirectly connected thereto via a conventional gearbox or other conventional power transmission device (also not shown).

When the cam wheel belt 100 is driven, the cam wheel pulley 98 is rotated, thereby turning the cam wheel pivot 96 and the cam wheel 94 thereon. This motion causes the cam 92 on the cam wheel 94 to rotate and to drive the camshaft 90 and kick member 82. The kick member 82 thereby follows a cyclical path every full rotation of the cam wheel 94, swinging from a product supportive position between the upstream and downstream conveyor belts 12, 14 and a retracted position. When properly timed as described below, the kick member 82 is in a product supportive position as the product is cut by the log saw blade 16, but quickly retracts immediately thereafter (due to the preferred D-shape of the cam 92 on the cam wheel 94) and returns after the log saw blade 16 has passed. Although an L-shaped kick member 82 is preferred, other kick member shapes such as the U-shaped kick member mentioned above can instead be used. The particular kick member shape depends at least in part upon how the kick member 82 is actuated (i.e., whether actuated about a kick member pivot 88 or in another manner as described below). Regardless of the kick member shape used, all kick members share the ability to support product at least at one location between the upstream and downstream conveyor belts 12, 14.

In operation of the illustrated preferred embodiment, product is preferably conveyed from upstream equipment by the upstream conveyor belts 12. In the illustrated preferred embodiment, the product is lightly compressed between the upper and lower upstream conveyor belts 12 for greater control over the conveyed product. The conveyed product eventually reaches the end rollers 72 in the preferred embodiment, and is transferred thereby to the end surface plates 70 that are stationary beside the end rollers 72. The end rollers 72 and the end surface plates 70 are preferably flush with the facing surfaces of the upper and lower conveyor belts 12 so that the conveyed product remains slightly compressed as it enters the space between the end rollers 72 and the end surface plates 70. The conveyed product at this stage has reached a product discharge area between the conveying surfaces defined by the upstream conveyor belts 12, 14 and by the end rollers 72 and end surface plates 70. This product discharge area can also be defined by just the end portions of the upstream conveyor belts 12, 14 where no end rollers 72 or end surface plates 70 are used, or can be defined by the end conveying surface areas of any other product conveying device used in place of conveyor belts 12, 14.

The product is now conveyed from the product discharge area to the transfer members 2 in the gap 18 which are preferably located beside the upstream conveyor belts 12 (or adjacent to the end surface plates 70 or end rollers 72 if used) at a log receiving station. At approximately this time, the camshafts 62 of the upper and lower camshaft assemblies 56 are preferably moving in a downstream direction (in the direction of the conveyed product), pushing the transfer members 2 with them. Therefore, the plates 44 of the transfer members 2 are moved in a downstream direction with the conveyed product. The stroke of the camshafts 62 is preferably sufficient to move the plates 44 from a location adjacent to the upstream conveyor belts 12 (or adjacent to the end plates 70 or end rollers 72 if used) at the log receiving station to a location adjacent to the downstream conveyor belts 14 at a log discharge station. At this point, the conveyed product is discharged from the transfer members 2 by the downstream conveyor belts 14, which preferably convey the product to downstream operations.

It should be noted that where the end surface plates 44 are used, the transfer members 2 need not necessarily move to a position adjacent to the upstream conveyor belts 12 or end rollers 72 to receive the conveyed product, but can instead move to positions behind the end surface plates 70 until the conveyed product enters the gap 18. In this way, product is supported and/or contained as it moves into the gap 18, and especially as a new end of product is entering the gap 18. Assuming a sufficient gap width 18 exists and/or relatively narrow plates 44 are used, the transfer members 2 can even move to locations adjacent to the end surface plates 44 to receive the conveyed product, whereby the product slides across the end surface plates 70 and across at least part of the plates 44 prior to movement of the plates 44 toward the downstream conveyor belts 14.

The transfer members 2 preferably move with the conveyed product as it travels through the gap 18. Although a speed difference can exist between the speed of the transfer members 2 and the speed of the product, the transfer members 2 more preferably move downstream at the speed of the conveyed product to a location downstream of the upstream conveyor belts 12. In most preferred embodiments of the present invention, this location is a position adjacent to the downstream conveyor belts 14. At this point, the transfer members 2 preferably reverse direction and travel back to their log receiving station positions adjacent to the upstream conveyor belts 12 (or adjacent to the end rollers 72 or behind the end surface plates 70 as the case may be). In the illustrated preferred embodiment, this reversal occurs when the second camshaft pins 64 of the camshaft assemblies 56 reach their most downstream positions and begin to move in an upstream direction as they orbit about the pivots 68. Reciprocating movement of the transfer members 2 is therefore established by continued rotation of the pivots 68. Where long logs of product are conveyed through the system, a number of transfer member cycles can occur for each log, with the plates 44 moving forward with the product, retracting while the product continues to feed into the downstream conveyor belts 14, and moving forward again with another section of the product. The conveyed product is therefore only partially supported in the gap 18 during each reciprocation of the transfer members 2. Also, the plates 44 of the transfer members 2 are preferably spaced apart a distance sufficient to permit relative movement of the plates 44 and the product between the plates 44. Depending at least in part upon the type of product conveyed, a light compression can exist between the plates 44 while still permitting such movement.

As described above, movement of the log saw blade 16 is through the conveyed product and with the conveyed product (the size of the gap 18 therefore preferably being a function of blade movement with the product). When the log saw blade cutting speed decreases or when the product conveying speed increases, the gap size should be sufficient to accommodate the log blade travel accordingly. Therefore, the gap 18 and the amount of transfer member travel is preferably selected for the slowest anticipated cutting speed of the log saw blade 16 (in a downward direction as viewed in the figures) and the fastest product conveying speed. With the gap size selected, movement of the log saw blade is preferably timed to coincide with movement of the transfer members 2. Specifically, the log saw blade 16 preferably comes into contact with product passing through the gap 18 as the plates 44 are moving in a downstream direction, and continues to cut through the product while the product and plates 44 are moving together downstream. This cutting path is represented in FIG. 4 as a series of blade locations.

Therefore, a full transfer member cycle preferably includes moving the transfer member 2 from its log receiving station adjacent to an upstream conveyor belt 12 (or an end roller 72 or end surface plate 70) to a position beside which the conveyed product is cut by the log saw blade 16, and then to its log discharge station adjacent to a downstream conveyor belt 14. This motion is preferably continuous, smooth, and uninterrupted.

By changing the time at which the log saw blade 16 cuts product in the gap 18, the log saw blade 16 cutting location can be altered as desired. For example, it may be desirable for blade cutting to begin and end a distance away from the upstream conveyor belts 12 (or the end rollers 72 or end surface plates 70) and the downstream conveyor belts 14, respectively. In such case, the cutting process only occupies a portion of the gap 18. Alternatively, it may be desirable to initiate cutting just as the plates 44 begin to move downstream and/or to complete cutting just as the plates 44 reach the downstream conveyor belts 14 (or the kick member 82 if used). Although not preferred in log sawing operations, but possibly preferable in other log processing operations such as adhesive application, log marking, log slitting, product banding, etc., the device operating upon the product in the gap 18 can begin and/or end product operations while moving in an upstream direction.

Where a kick member 82 is used, the log saw blade 16 is preferably timed and positioned to complete its cut through product in the gap 18 adjacent to the kick member 82. In the illustrated preferred embodiment, the blade 16 passes immediately beside the transverse arm 84 of the kick member 82 in its sweep through the product. Product downstream of the kick member 82 is therefore supported by the kick member 82 during the cut, preventing product fanning or sagging caused by the cutting operation. The finished cut can often be significantly improved with such support. Preferably, the kick member 82 swings from its product supporting position to its retracted position immediately after the product cut has been completed or just as the cut is being completed. This retraction movement can instead be timed to occur slightly ahead or behind these times as desired and to obtain different cut results.

The kick member 82 is preferably timed to return to its product supporting position after the log saw blade 16 has passed through the gap 18. By virtue of its attachment to the pivot 88 and camshaft 90, the kick member 82 preferably reciprocates in time with log saw movement and transfer member movement to support the conveyed product during each cut. As discussed above and with reference again to FIG. 3, the log saw 15 is preferably driven by the same driving device (e.g., motor, not shown) as the camshaft assemblies 56 and the kick member 82. As such, the kick member 82, the transfer members 2 and the log saw 15 are preferably all timed to operate synchronously via belts and pulleys. Also, the speed at which the log saw 15, the transfer members 2, and the kick member 82 travel through their paths of motion is preferably controllable by a system controller (not shown) and is preferably a function of the product speed through the system. In the most preferred embodiment of the present invention, the log saw blade 16 is timed to pass through the gap 18 as the plates 44 of the transfer members 2 are moved downstream with the conveyed product and as the kick member 82 is brought to its product supporting position. The log saw blade 16 is therefore preferably also timed to be away from the gap 18 as the plates 44 are returned upstream and as the kick member 82 is away from its product supporting position. If desired however, it is possible to change the timing of the log saw 15, transfer members 2, and kick member 82 so that their movements coincide in any desired manner. In each case however, the transfer members 2 preferably reciprocate while an operation is performed upon the portion of the conveyed product in the gap 18.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims. For example, although the top and bottom conveyor belts 12, 14 and their associated elements described above and illustrated in the drawings are substantially mirror images of one another, this need not necessarily be the case. By way of example, an end roller 72 or an end surface 70 may only be employed on an upper or a lower upstream conveyor belt 12 rather than on both. Also, the range of movement of the upper and lower transfer members 2 can be different to permit the plates 44 to move different distances in their cycles. Similarly, the speeds at which the transfer members 2 move can be different (such as by increasing the distance between the second camshaft pin 64 on one camshaft assembly 56 and its associated pivot 68) to permit one plate 44 to stay in synchronicity with the other plate while traveling a different distance.

The system described above and illustrated in the figures is substantially horizontal. Therefore, movement of the transfer members 2 is also substantially horizontal to follow the substantially horizontal path of product conveyed therethrough. However, the principles of the present invention can be applied to systems having virtually any orientation. With proper compression upon product between the conveyor belts 12, 14 (established by the preferably adjustable distance between the upper and lower belts) to control product movement, the system can be diagonal or even vertical, or can be rotated any number of degrees about its longitudinal axis so that the transfer members 2 are not located above and below the product as shown. Therefore, the transfer members 2 and their plates 44 may not necessarily support product passing through the gap 18 as much as they restrain conveyed product from slipping, spilling, or falling during transfer or cutting operations. Terms such as "support" used herein and in the appended claims therefore do not necessarily mean or are limited to support against gravitational forces, but can include support against undesirable product movement during product transfer, cutting, or other operations.

In the most preferred embodiment of the present invention, two pairs of conveyor belts 12, 14 are separated a distance apart to define the gap 18, each upstream conveyor belt having a transfer member 2 associated therewith. However, the present invention is not limited to any particular number of conveyor belts 12, 14 and associated transfer members 2. For example, the pair of upstream conveyor belts 12 can be replaced by only one conveyor belt with one associated transfer member 2, or both pairs of conveyor belts 12, 14 can be replaced by one belt and associated transfer member 2. Such designs can limit the ability to orient the system and product conveyed therethrough, but can greatly simplify system design. Similarly, the pair of upstream or downstream conveyor belts 12, 14 can be replaced by three or more belts and associated transfer members 2 if desired, such as four belts and transfer members arranged to fully enclose product being conveyed through the system. It should also be noted that the number of transfer members 2 can be different than the number of upstream or downstream conveyor belts 12. For example, a system can have upstream and downstream conveyor belts 12, 14 as in the illustrated preferred embodiment, but only have a transfer member 2 associated with the lower upstream conveyor belt 12. Any combination of transfer members 2 and conveyor belts 12, 14 is possible in the present invention. When reference is made herein and in the appended claims to any particular number of conveyor belts or transfer members, the system described or claimed is understood to have at least the specified number of belts or transfer members, and can include more.

Although conveyor belts are the preferred conveying device used with the present invention, many other conventional conveying devices can be used if desired. Such alternative conveying devices include without limitation other types of conveyor belts such as multiple side-by-side belts or tabletop belts, chain conveyors, elevator conveyors (e.g., a series of platforms mounted upon a chain moving each platform in series in line with the transfer members 2, product being ejected from the platforms to the transfer members 2 in any conventional manner), a table across which product is pushed by any conventional pushing device (e.g., a plate, set of fingers, or bar pushed by an actuator to push product from the table to the transfer members 2), chutes down which product falls into or out of the transfer members, and the like. Virtually any device capable of conveying product to or away the transfer members 2 can be used in connection with the present invention, dependent at least in part upon the size, shape, and type of product being conveyed. Such product conveying devices are referred to in the appended claims as "product input conveyors" and "product output conveyors" to reflect the different forms the devices can take. Each device preferably at least has a surface adjacent to the gap 18 (hereinafter and in the appended claims referred to as a "conveying surface" which may or may not be movable) for product transfer to or from the transfer members 2. It should be noted that the term "conveying surface" includes not only such elements as the conveyor belts 12, 14 in the preferred embodiment above, but can also include such elements as the end rollers 72 and the end surface plates 70 (if used) inasmuch as these elements cooperate with the conveyor belts 12, 14 to convey product to the transfer devices 2.

Each transfer member 2 in the most preferred (illustrated) embodiments of the present invention is actuated by a camshaft assembly 56 as described above. However, one having ordinary skill in the art will appreciate that a number of other actuation assemblies can be used to perform the same functions as the camshaft assemblies 56. For example, either or both transfer members 2 can be driven by a rack and pinion gear set, by sets of pulleys and cables to which the transfer members 2 are attached in a conventional manner for movement by winding of the cables, by rails along which the transfer members 2 slide in response to selective energization of magnets on the rails and the transfer members 2 (such magnetic rail systems being well known to those skilled in the art), by conventional electrical, pneumatic, or hydraulic actuators connected to the transfer members 2 and actuatable to move the transfer members 2 through their ranges of motion, and the like. Each such actuation assembly performs the same functions as the camshaft assemblies 56 of moving the plates 44 between the upstream and downstream conveyor belts 12, 14. Still other actuation assemblies can instead be used and fall within the spirit and scope of the present invention.

The optional kick member 82 of the present invention is preferably actuated by the camshaft 90, cam 92, and cam wheel 94 assembly and is preferably driven by belts and pulleys as described above and illustrated in the figures. As one having ordinary skill in the art will appreciate, many other conventional devices and assemblies can instead be used to actuate and drive the kick member 82. For example, the kick member 82 can be actuated by a gear set connected to the pivot 88 for rotation thereof and connected to the powering shaft 71 in any conventional manner, can be directly actuated by one or more electrical, pneumatic, or hydraulic actuators preferably actuated by a system controller at regular time intervals, in response to one or more sensors mounted to detect log, transfer member, or actuation assembly positions, or in response to movement of the log saw blade 16 and/or the transfer members 2, can be lifted by a cam rotated beside and abutting the kick member 82 (and preferably driven in a conventional manner by associated power transmission elements such as belts, pulleys, and the like connected to the log saw driving device), etc. Like the cam assembly employed in the preferred embodiment of the present invention, each such alternative assembly shares the common function of cyclically lifting the kick member 82 in synchronicity with movement of the saw blade 16 and the transfer members 2. In this regard, it should be noted that the kick member 82 need not necessarily be mounted beside the lower downstream conveyor belt 14 as shown in the figures. For example, the kick member 82 can be a bar, rod or other member injected or swung into position from beside the gap 18 (into or out of the plane of the page in FIGS. 3 and 4). Still other kick member positions and actuation paths are possible and fall within the spirit and scope of the present invention.

Although the present invention can be employed in relation to one or more upstream conveyor belts 12 and one or more downstream conveyor belts 14 with the transfer member(s) reciprocating therebetween, the present invention can also be used in connection with virtually any other upstream or downstream equipment. For example, one or more upstream conveyor belts can convey product to the transfer members 2 while clamp members, suction equipment, or other devices discharge the product directly to equipment adjacent to the transfer members 2. Alternatively, an upstream machine or system can be located adjacent to the transfer members 2 in place of the illustrated upstream conveyor belts 12. All such systems, however, preferably have at least a conveying surface adjacent to the transfer members 2 and located immediately upstream or downstream from the reciprocating transfer members 2. Also, although the transfer members 2 are preferably mounted at the ends of the upstream conveyor belts 12 and the kick member 82 is preferably mounted at the end of a downstream conveyor belt 14 as shown in the figures, the locations of these elements and their related assemblies can be reversed (i.e., the transfer member 2 being mounted at the ends of the downstream conveyor belts 12 and the kick member 82 mounted at the end of an upstream conveyor belt 12). Such a system would operate in substantially the same manner as the preferred embodiment above, but with the subject assemblies reversed in location. One having ordinary skill in the art will appreciate that it is even possible for the transfer members 2 and the kick member 82 to be mounted on system framework on either side of the gap 18 and conveyor belts 12, 14 if it is preferred not to mount these members to framework connected to the conveyor belts 12, 14.

Finally, it should be noted with reference to the appended claims that when one element is said to be "coupled" to another, this does not necessarily mean that one element is fastened, secured, or otherwise attached to another element. Instead, the term "coupled" means that one element is either connected directly or indirectly to another element or is in mechanical or electrical communication with another element.

We claim:

1. A conveyor product transfer apparatus for use with a log saw and a pair of conveying surfaces, the conveyor product transfer apparatus operable to move product in a product path through the conveyor product transfer apparatus, the log saw movable through a log saw path intersecting the product path to cut product in the conveyor transfer apparatus, the conveyor product transfer apparatus comprising:

a pair of transfer members in substantially facing and spaced relationship with one another to define a throat substantially therebetween, the transfer members mounted for substantial translational movement between the pair of conveying surfaces and a location disposed from the conveying surfaces, the transfer members movable toward and away from the log saw path; and at least one actuation assembly coupled to the transfer members for actuation thereof, the transfer members coupled to the log saw via the at least one actuation assembly for substantially synchronous movement with the log saw.

2. The conveyor product transfer apparatus as claimed in claim 1, wherein at least one of the transfer members has a plate defining a surface of the throat within which product is received.

3. The conveyor product transfer apparatus as claimed in claim 1, wherein the transfer members are a pair of facing plates defining substantially opposing surfaces of the throat within which product is received.

4. The conveyor product transfer apparatus as claimed in claim 2, wherein the plate is coupled to at least one of the conveying surfaces for substantially translational movement with respect thereto.

5. The conveyor product transfer apparatus as claimed in claim 1, wherein the conveying surfaces convey product to the transfer members.

6. The conveyor product transfer apparatus as claimed in claim 1, wherein the conveying surfaces convey product away from the transfer members.

7. The conveyor product transfer apparatus as claimed in claim 1, wherein the conveying surfaces are facing conveyor belts separated a distance from one another and between which product passes.

8. The conveyor product transfer apparatus as claimed in claim 1, adapted for use with a second conveying surface located adjacent to the location disposed from the conveying surfaces, the transfer members being movable between the conveying surfaces and the second conveying surface.

9. The conveyor product transfer apparatus as claimed in claim 1, wherein at least one of the actuation assemblies includes a cam shaft coupled at one end to at least one of the transfer members for substantially translational movement thereof and at another end to the log saw.

10. The conveyor product transfer apparatus as claimed in claim 1, wherein at least one of the actuation assemblies includes an actuator coupled to at least one of the transfer members for substantially translational movement thereof and to the log saw.

11. The conveyor product transfer apparatus as claimed in claim 1, further comprising a track along which one of the transfer members is slidable.

12. The conveyor product transfer apparatus as claimed in claim 1, wherein at least one of the conveying surfaces includes a roll located at an end of the conveying surface and adjacent to at least one of the transfer members for establishing a smooth product transfer between the at least one of the conveying surfaces and the at least one of the transfer members.

13. The conveyor product transfer apparatus as claimed in claim 1, wherein the log saw is timed to cut product during transfer member movement away from the conveying surfaces.

14. The conveyor product transfer apparatus as claimed in claim 1, wherein the log saw is timed to cut product during transfer member movement toward the conveying surfaces.

15. The conveyor product transfer apparatus as claimed in claim 13, wherein the log saw is a skew saw.

16. The conveyor product transfer apparatus as claimed in claim 1, further comprising a kick member located adjacent to a path of the log saw, the kick member being positionable to at least partially support product being cut by the log saw.

17. The conveyor product transfer apparatus as claimed in claim 16, wherein the kick member is coupled to the log saw for substantially synchronous movement therewith.

18. The conveyor product transfer apparatus as claimed in claim 16, wherein the kick member is coupled to the log saw for substantially synchronous movement via a cam and camshaft.

19. A conveyor product transfer apparatus for use with a log saw, a product input conveyor, and a product output conveyor, the conveyor product transfer apparatus operable to convey product through a product path from the product input conveyor to the product output conveyor, the log saw movable through a log saw path intersecting the product path between the product input conveyor and the product output conveyor to cut product in the conveyor product transfer apparatus, the conveyor product transfer apparatus comprising:

a transfer member located between the product output conveyor and the product input conveyor, the transfer member movable between a first position substantially beside the product output conveyor for receiving product, a second position substantially beside the log saw path, and a third position substantially beside the product input conveyor for discharging product; and an actuation assembly coupled to the transfer member, the actuation assembly actuatable to move the transfer member to the first, second and third positions.

20. The conveyor product transfer apparatus as claimed in claim 19, wherein the product output conveyor includes at least one conveyor belt.

21. The conveyor product transfer apparatus as claimed in claim 20, wherein the product output conveyor includes a pair of substantially facing conveyor belts spaced a distance apart and through which product is moved.

22. The conveyor product transfer apparatus as claimed in claim 19, wherein the product input conveyor includes at least one conveyor belt.

23. The conveyor product transfer apparatus as claimed in claim 22, wherein the product input conveyor includes a pair of substantially facing conveyor belts spaced a distance apart and through which product is moved.

24. The conveyor product transfer apparatus as claimed in claim 19, wherein the transfer member includes a plate defining a surface which contacts product in product conveyance by the transfer member.

25. The conveyor product transfer apparatus as claimed in claim 19, wherein the transfer member is coupled to one of the product output conveyor and the product input conveyor for movement with respect thereto.

26. The conveyor product transfer apparatus as claimed in claim 19, wherein the transfer member is a pair of substantially facing plates separated by a distance sufficient to receive product therebetween.

27. The conveyor product transfer apparatus as claimed in claim 19, wherein the log saw is timed to move substantially synchronously with the transfer member, the log saw timed to cut product during transfer member movement from the first position.

28. The conveyor product transfer apparatus as claimed in claim 19, wherein the log saw is a skew saw.

29. The conveyor product transfer apparatus as claimed in claim 19, wherein the log saw is coupled to the actuation assembly, the log saw and the transfer member thereby being coupled for substantially synchronous movement.

30. The conveyor product transfer apparatus as claimed in claim 19, wherein the actuation assembly includes an actuator having an end coupled to the transfer member for movement thereof.

31. The conveyor product transfer apparatus as claimed in claim 30, wherein the actuation assembly includes a camshaft coupled to the transfer member for translation thereof, the camshaft also being coupled to a cam for transmitting rotary motion of the cam into substantially translational motion imparted to the transfer member.

32. The conveyor product transfer apparatus as claimed in claim 19, wherein the transfer member includes a sliding member and wherein the apparatus further includes a track, the sliding member being mounted for sliding movement along the track.

33. The conveyor product transfer apparatus as claimed in claim 19, wherein the product output conveyor includes a roll at an end thereof adjacent to the first position for transfer of product from the product output conveyor to the transfer member.

34. The conveyor product transfer apparatus as claimed in claim 19, further comprising a kick member located adjacent to the second position, the kick member movable between a first location adjacent to a path of the log saw and a second location disposed from the path of the log saw.

35. The conveyor product transfer apparatus as claimed in claim 34, wherein movement of the kick member is timed to position the kick member and the log saw on opposite sides of the product prior to product cutting.

36. The conveyor product transfer apparatus as claimed in claim 34, wherein the kick member is coupled to the log saw for substantially synchronous movement of the kick member and the log saw.

* * * * *